United States Patent
Taneda et al.

(10) Patent No.: US 7,290,772 B2
(45) Date of Patent: Nov. 6, 2007

(54) STABILIZER CONTROL DEVICE FOR VEHICLE

(75) Inventors: Akiya Taneda, Anjo (JP); Katsumi Suzuki, Takahama (JP); Hideyuki Kobayashi, Toyota (JP); Shuuichi Buma, Toyota (JP); Masaaki Tabata, Chiryu (JP); Shingo Urababa, Toyota (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 203 days.

(21) Appl. No.: 10/522,018

(22) PCT Filed: Mar. 26, 2004

(86) PCT No.: PCT/IB2004/000912

§ 371 (c)(1),
(2), (4) Date: Jan. 21, 2005

(87) PCT Pub. No.: WO2004/085179

PCT Pub. Date: Oct. 7, 2004

(65) Prior Publication Data

US 2005/0236793 A1 Oct. 27, 2005

(30) Foreign Application Priority Data

Mar. 28, 2003 (JP) .............................. 2003-092887

(51) Int. Cl.
B60G 15/17 (2006.01)

(52) U.S. Cl. ................ 280/5.508; 280/5.511; 280/124.107

(58) Field of Classification Search ............. 280/5.508, 280/5.511, 124.106, 124.107, 124.152
See application file for complete search history.

(56) References Cited

U.S. PATENT DOCUMENTS 4,660,669 A 4/1987 Shimizu (Continued)

FOREIGN PATENT DOCUMENTS

DE 198-50-169 C1 7/2000

(Continued)

OTHER PUBLICATIONS

*Korean Office Action with English Translation of Office Action.

(Continued)

*Primary Examiner*—Paul N. Dickson
*Assistant Examiner*—Tiffany L. Webb
(74) *Attorney, Agent, or Firm*—Buchanan Ingersoll & Rooney PC

(57) ABSTRACT

A stabilizer control device for vehicle includes a pair of stabilizer bars (31, 32) provided between a left wheel and a right wheel of a vehicle, and an actuator including a reduction mechanism (RD) connecting between said pair of stabilizer bars (31, 32) and a motor (M) connected to the reduction mechanism (RD) for providing torsion force to said pair of stabilizer bars (31, 32) through the reduction mechanism (RD) wherein the reduction mechanism (RD) comprises a first gear (25) and a second gear (26) for generating relative rotational speeds differential therebetween, the first gear (25) and the second gear (26) are coaxially placed adjacent to each other, and opposed side faces of stabilizer bars (31, 32) are adjacently connected with the first gear (25) and the second gear (26) respectively and disposed in the reduction mechanism (RD).

10 Claims, 8 Drawing Sheets

U.S. PATENT DOCUMENTS

| | | | |
|---|---|---|---|
| 4,796,911 A * | 1/1989 | Kuroki et al. | 280/5.511 |
| 6,425,585 B1 | 7/2002 | Schuelke et al. | |
| 6,428,019 B1 * | 8/2002 | Kincad et al. | 280/5.511 |
| 6,457,730 B1 * | 10/2002 | Urbach | 280/124.161 |
| 6,698,767 B2 * | 3/2004 | Hagan | 280/5.511 |
| 6,805,361 B2 * | 10/2004 | Germano et al. | 280/5.511 |
| 2002/0113393 A1 * | 8/2002 | Urbach | 280/124.106 |
| 2002/0121748 A1 * | 9/2002 | Ignatius et al. | 280/5.511 |
| 2002/0180167 A1 * | 12/2002 | Schmidt et al. | 280/5.511 |
| 2004/0217560 A1 * | 11/2004 | Heller et al. | 280/5.502 |

FOREIGN PATENT DOCUMENTS

| | | |
|---|---|---|
| JP | 03182832 | 11/1991 |
| JP | 2002-518245 | 6/2002 |
| JP | 2002-205523 A | 7/2002 |
| KR | 2001-0023246 | 3/2001 |
| WO | 99/67100 | 12/1999 |
| WO | 01/68390 A1 | 9/2001 |

OTHER PUBLICATIONS

*"Kikougaku" by K. Ogawa and I. Katoh, 1$^{st}$ edition, 7$^{th}$ print, Morikita Shuppan Co., Ltd pp. 164-165, Mar. 5, 1971.

* Principles of Harmonic Drive mechanism, http://www.hds.co.jp/HDS_hp_english/english/hd/index.html (retrieved on Feb. 13, 2004).

"Fundamentals and Design Calculation Methods of Planetary Gear Mechanism and Differential Gear Mechanism", M. Morozumi et al., First Edition, Aug. 27, 1989, pp. 25-29 and 192-206.

Official Action issued by Japanese Patent Office and English language translation of Official Action.

* cited by examiner

STABILIZER CONTROL DEVICE FOR VEHICLE

FIELD OF THE INVENTION

The present invention generally relates to a stabilizer control device for vehicle. More particularly, the present invention pertains to a stabilizer control device for vehicle which controls torsion force of a stabilizer device disposed between left and right wheels of a vehicle.

BACKGROUND OF THE INVENTION

A stabilizer control device for a vehicle commonly gives appropriate roll moment to a stabilizer bar provided between left and right wheel of the vehicle while turning travel. As an example to realize this function, a disclosed Japanese Patent Laid-open Publication No. 2002-518245 has been proposed. In this disclosed document, a roll stabilizer device for a vehicle has been constructed wherein an electromechanical rotating actuator is disposed between a pair of stabilizer bars. Additionally, a motor and a reduction gear device are interposed between said pair of stabilizer bars. The reduction gear device is made of a common multistage planetary gear mechanism.

In above mentioned roll stabilizer device of a vehicle, the motor and the reduction gear device are provided as a unit which is referred to as an actuator. The length of each divided stabilizer bar with the actuator system is shorter than that of previous type (i.e. non divided, a single stabilizer bar) without actuator system as much as width direction length of the actuator. Accordingly, compared with the single stabilizer bar, the thickness of the divided stabilizer bar turns into thick to ensure the torsion force necessary only by the stabilizer bar while the actuator does not work.

Thus, whole the stabilizer system becomes larger and heavier. This causes restriction for mounting to vehicle since one side of stabilizer bar will be attached to a suspension member.

As an example of a reduction mechanism for providing large reduction ratio, a Ferguson Mechanical Paradox has been published on "Kilougaku" by K. Ogawa and I. Katoh, 1st. edition, 7th print, Morikita Shuppan Co. Ltd. pages. 164-165 (Mar. 1, 1976). As another example of a reduction mechanism, a harmonic drive mechanism (which is the trademark of Harmonic Drive Systems, Inc.) has been opened on the web site http.//www.hds.co.jp/HDS_h-p_english/english/hd/index.html (retrieved on Feb. 13, 2004).

DISCLOSURE OF THE INVENTION

In light of foregoing, according to an aspect of the present invention, a stabilizer control device for vehicle includes a pair of stabilizer bars disposed between a left wheel and a right wheel of a vehicle, and an actuator including a reduction mechanism connecting said pair of stabilizer bars and a motor connected to the reduction mechanism for providing torsion force to said pair of stabilizer bars through the reduction mechanism wherein the reduction mechanism comprises a first gear and a second gear for generating relative rotational speeds differential therebetween, the first gear and the second gear are coaxially placed adjacent to each other, and opposed side faces of stabilizer bars are adjacently connected with the first gear and the second gear respectively and disposed in the reduction mechanism.

It is preferable that the first gear and the second gear include a pair of internal tooth gears with different number of teeth, and a common planetary gear train is engaged with both internal tooth gears.

It is preferable that the first gear and the second gear are cooperatively associated with each other.

It is preferable that the motor is a brush-less motor with a rotor and a stator, and one of the pair of stabilizer bar is integrally attached to the first gear through the rotor.

It is preferable that the motor and the reduction mechanism are disposed in a housing, and the other of the pair of stabilizer bar is integrally attached to the housing.

It is preferable that the motor and the reduction mechanism are disposed in a housing, and the one of the pair of stabilizer bars connected to the first gear passing through the rotor is supported at both sides of the motor and the first gear.

It is preferable that the one of the stabilizer bar is attached to the housing by spline connection.

It is preferable that the planetary gear train includes plural planetary gear sets.

It is preferable that the planetary gear train is a multistage planetary gear.

It is preferable that a rotation detection means is disposed in the housing for detecting rotation of at least one of the stabilizer bars.

BRIEF DESCRIPTION OF THE DRAWINGS

The foregoing and additional features and property of the present invention will become more apparent from the following detailed description considered with reference to the accompanying drawing figures wherein.

DETAILED DESCRIPTION OF PREFERRED EMBODIMENTS

A preferred embodiment of the present invention will be described hereinbelow in detail with reference to the accompanying drawings.

Figure 1:
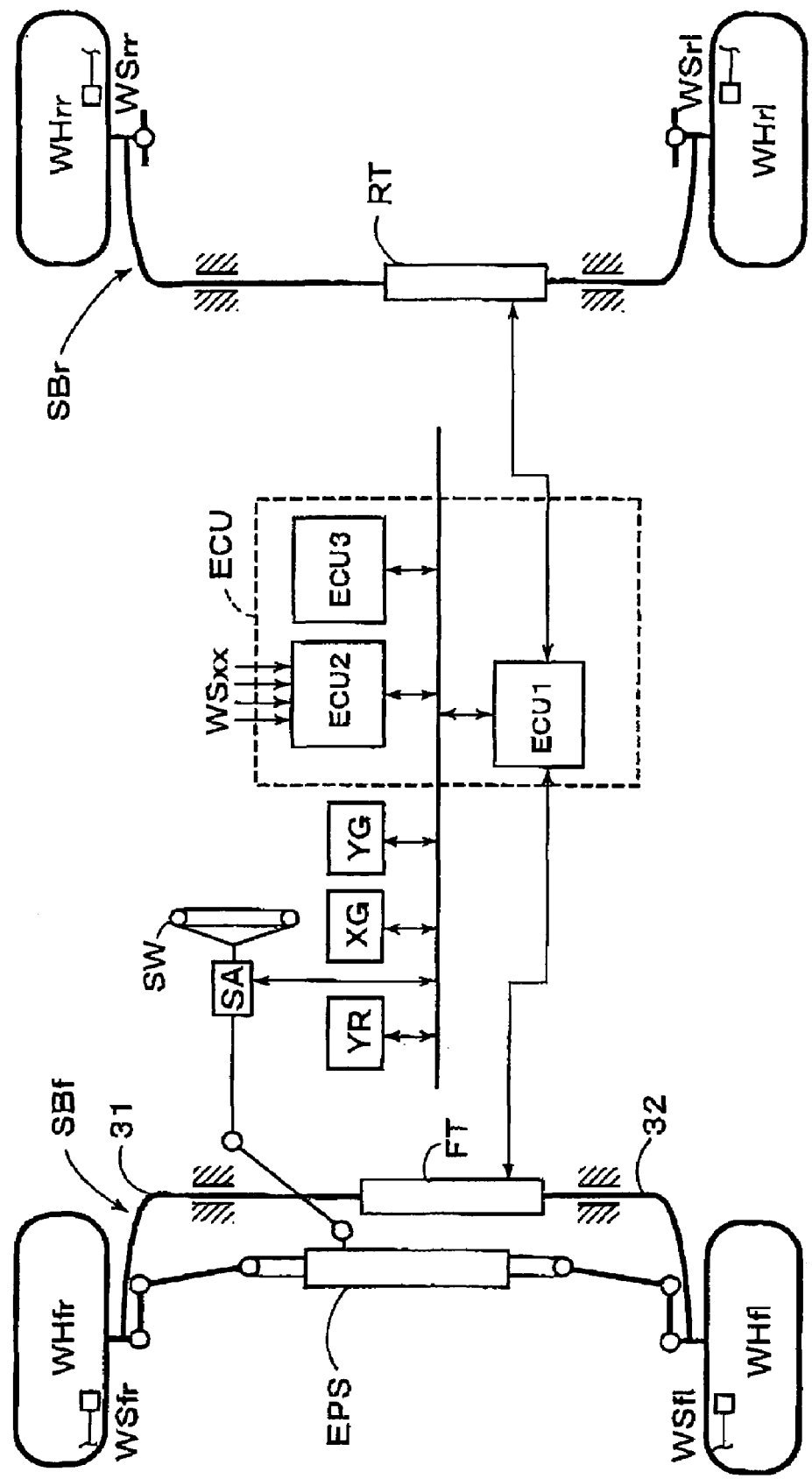
FIG. 1 is a plane view schematically illustrating a vehicle comprising a stabilizer control device according to the first embodiment of the present invention.

A first embodiment of the present invention is explained referring to FIGS. 1 to 5. As shown in FIG. 1, a front stabilizer SBf and a rear stabilizer SBr are disposed at front wheel side and rear wheel side of a vehicle body (not shown), respectively. Each stabilizer SBf, SBr works as a torsion spring when a roll directional motion is supplied to the vehicle. Also, each stabilizer is constructed to control variable torsion force using a stabilizer actuator (hereinafter referred to as an actuator) FT, RT. In addition, actuators FT, RT are controlled by a stabilizer control unit ECU1 provided in a electronic control unit ECU.

As shown in FIG. 1, wheel speed sensors WSfr, WSfl, WSrr, and WSrl are disposed at front right wheel, front left wheel, rear right wheel, and rear left wheel. Each wheel speed sensors are connected to the electronic control unit ECU to input a signal with respect to a wheel rotation speed, respectively. A steering sensor SA for detecting steering angle of a steering wheel SW, a X acceleration sensor XG for detecting an acceleration with forward and backward movement, a Y acceleration sensor YG for detecting an acceleration in a vehicle width direction, and a yaw rate sensor YR for detecting yaw rate of the vehicle are connected to the electronic control unit ECU.

The electronic control unit ECU includes a brake control unit ECU2, a steering control unit ECU3 in addition to the stabilizer control unit ECU1. These control units ECU1, ECU2 and ECU3 are connected to a communication bus through a communication unit (not shown) including a CPU, ROM, and RAM.

Figure 2:
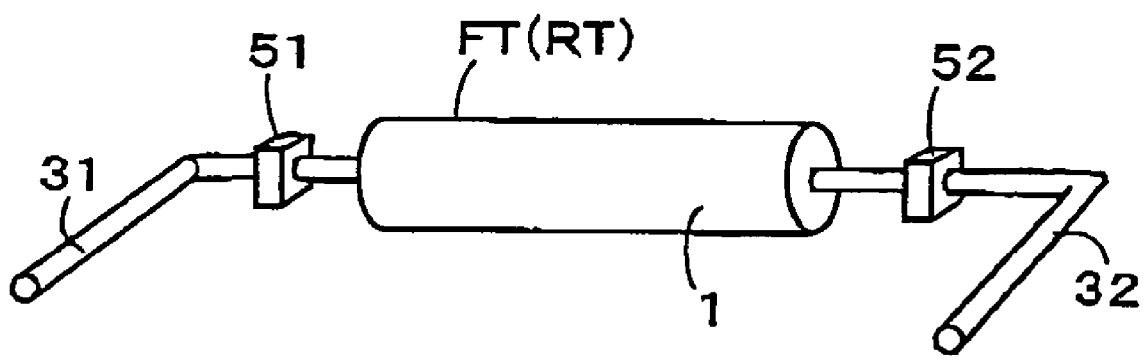
FIG. 2 is a perspective view schematically illustrating a conformation example of an actuator according to the first embodiment of the present invention.

FIG. 2 shows composition of the front stabilizer SBf. The rear stabilizer SBr has similar configuration to the front stabilizer SBf. One end of each stabilizer bar 31, 32 is connected to the right and left wheels in the vehicle, respectively. The other end of each stabilizer bar 31, 32 is connected to an actuator FT which will be explained in detail later. The stabilizer bars 31, 32 are held on vehicle body by using holding means 51, 52.

Figure 3:
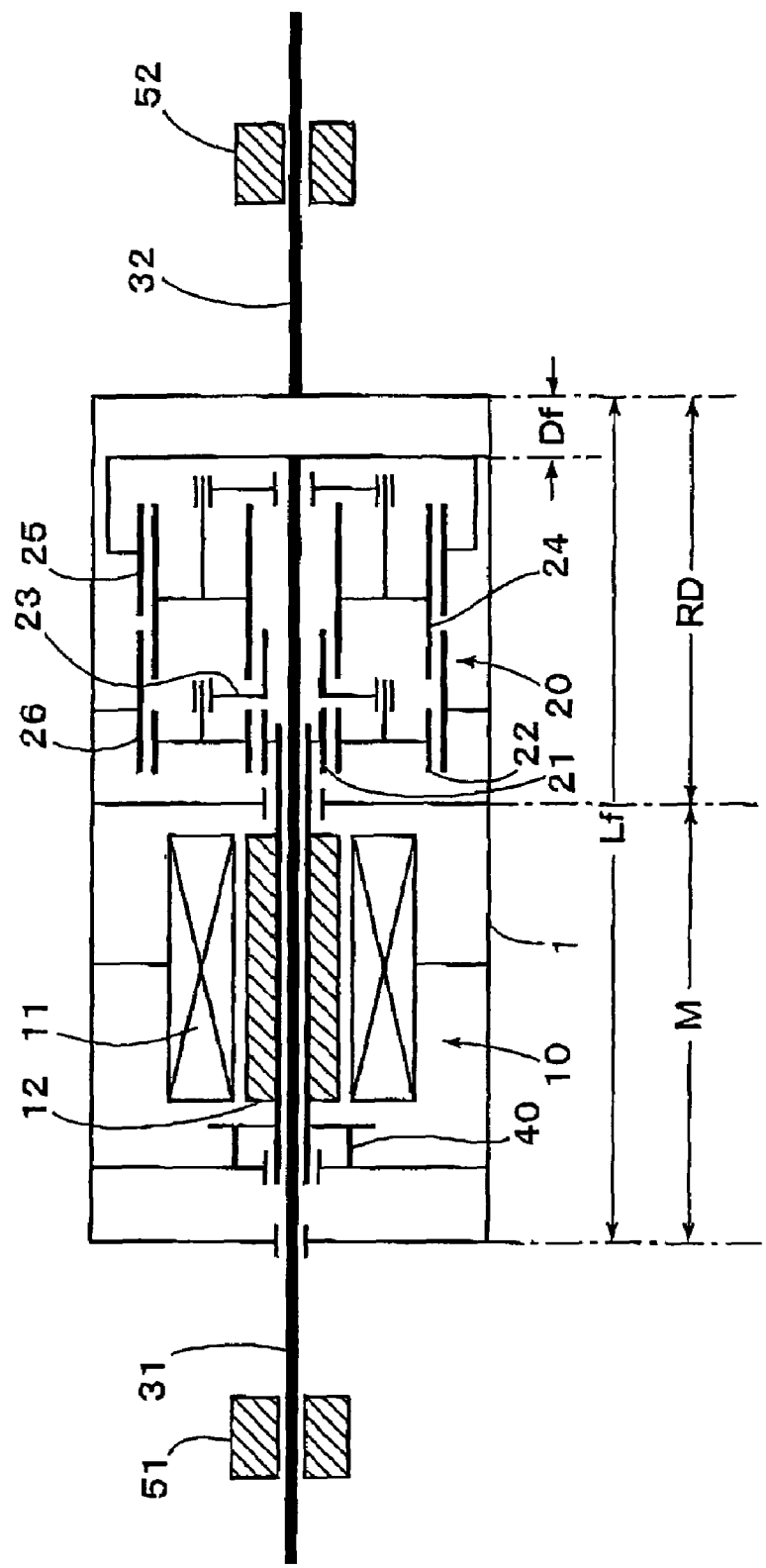
FIG. 3 is a cross sectional skeleton figure of an actuator according to the first embodiment of the present invention.

Each actuator FT, RT (hereinafter represented as FT) includes a motor M and a reduction mechanism RD, respectively. FIG. 3 is an example of the actuator FT. In the first embodiment, a three-phase brushless motor is used as the motor M. Although configuration of the motor M is shown as the three-phase brushless motor, another type of motor (for example, common motor including brush, and another phase number) may be used.

Accordingly, in the stabilizer control unit ECU1,target value of active roll moment is set for each front and rear wheel based on vehicle active roll moment set value and front/rear wheel roll torsion modulus set value for active control of vehicle roll moment. According to this target value of active roll moment, torsion stress for generating at front (and/or rear) actuator FT (and/or RT) is determined. Then, the motor is activated and controlled to reach the determined torsion stress. By making active work to control the torsion force to each stabilizer bar 31, 32 with the actuator FT, vehicle roll can be reduced or inhibited when the vehicle is driven. The control method of the stabilizer is not limited to the embodiment described, but another method (for example the method described in the disclosed Japanese Patent Laid-open Publication No. 2002-518245, cited above) may be used.

Figure 4:
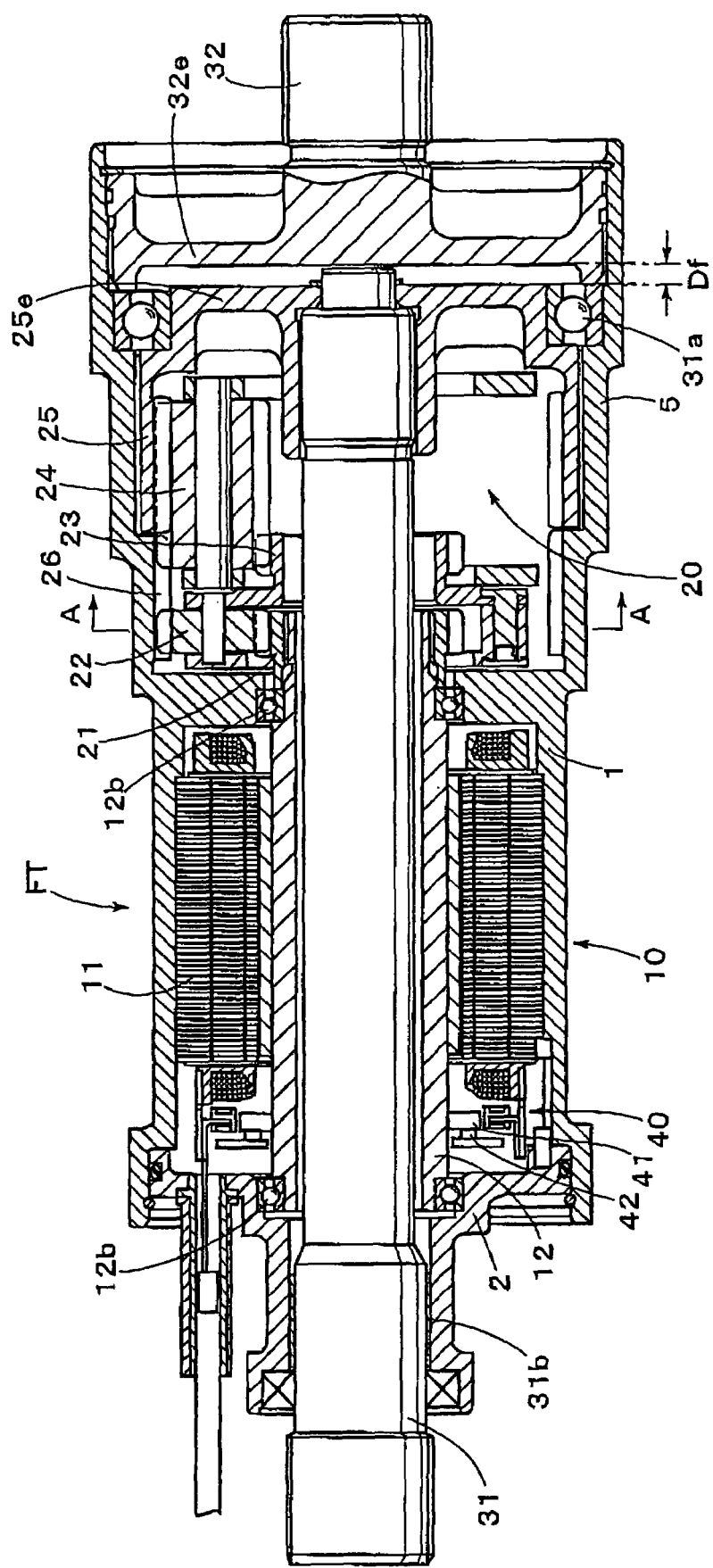
FIG. 4 is a cross sectional view of an actuator according to the first embodiment of the present invention.

Next, configuration of the actuator is explained in detail. An embodiment appliable to an actuator, which gives torsion force to each actuator FT and RT, is explained since actuators FT and RT are substantially same composition as shown in FIG. 1. FIG. 3 and FIG. 4 are a skeleton figure and a concrete cross sectional figure, respectively. In these figures, a brushless type DC motor 10 is used as the motor M, and a Furguson Mechanical Paradox 20 is used as a reduction mechanism, and corresponding elements are expressed as same number. The motor 10 and the Furguson Mechanical Paradox 20 are integrally composed, and accommodated in a housing 1.

For the Furguson Mechanical Paradox 20, the stabilizer bar 31 is rigidly connected to a ring gear 25 (first gear). Also, the stabilizer bar 32 is rigidly connected to a ring gear 26 (second gear). The actuator side of each stabilizer 31, 32 is placed adjacent to each other in the reduction mechanism RD in the housing 1. Namely, opposed side faces of stabilizer bars 31, 32 are placed with distance Df therebetween as shown in FIG. 3 and FIG. 4. To be more precise, as shown in FIG. 4, the stabilizer bar 31 is fixed to an endplate 25e integrally formed with the ring gear 25. On the other hand, an endplate 32e integrally formed with the stabilizer bar 32 are fixed to the housing 1 (for example, spline connection may be applied to fix). Accordingly, the stabilizer bar 32 is integrally jointed to the ring gear 26 since the ring gear 26 is integrally formed with the housing 1 interior side.

Figure 5:
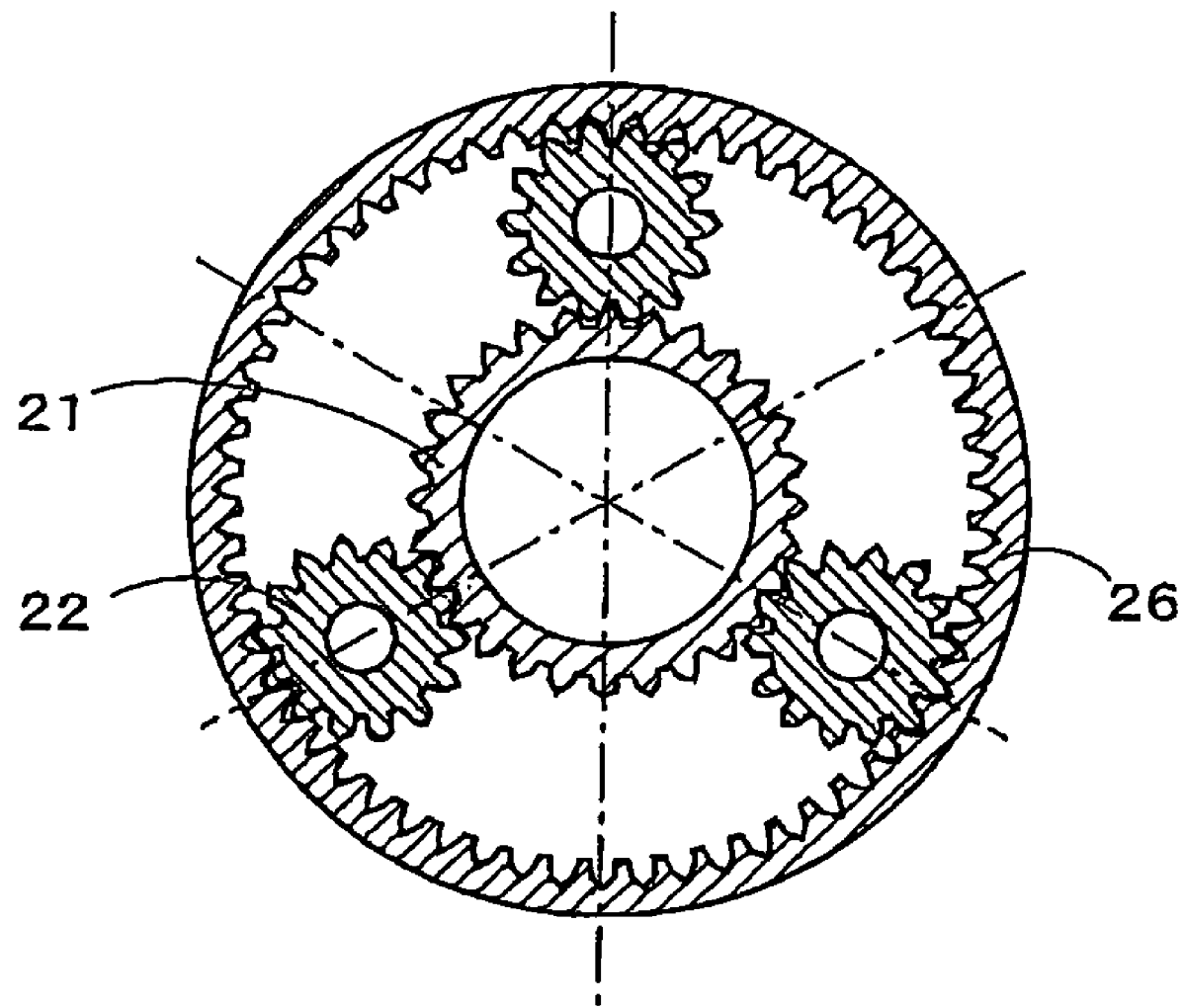
FIG. 5 is a cross sectional view taken along line A-A in FIG. 4.

Two ring gears 25, 26 are internal tooth gears with different number of teeth thereof (for example, number of teeth; 60 and 62). As a common planetary gear engaging with each ring gear 25, 26, three planetary gears 24 are movably supported around an axis of the stabilizer bar 31. In consideration of specification of the motor 10 and reduction ratio of the reduction mechanism RD, two-stage planetary gear is used in the present embodiment. As shown in FIG. 5 which is cross sectional view taken along A-A of FIG. 4, a sun gear 21 fixed to a rotor 12 of the motor 10 is provided to engage with three first-stage planetary gears (represented as 22).

The first-stage planetary gears 22 are rotatably supported by a sun gear 23 and rotatably supported around an axis of the stabilizer bar 31 (namely, rotational axis of the sun gears 21 and 23). These first-stage planetary gears 22 are engaged with the sun gear 21, and also the ring gear 26. Accordingly, the first-stage planetary gears 22 are rotatably supported between the sun gear 21 and the ring gear 26 as if they play sun-and-planet motion with an axis of the stabilizer bar. Second-stage planetary gears 24 are engaged with the sun gear 23 and the ring gear 25, 26. Accordingly, the second-stage planetary gears 24 rotate between the sun gear 23 and each ring gear 25, 26 as if they also play sun-and-planet motion with an axis of the stabilizer bar.

On the other hand, the motor 10 includes a stator 11 and a hollow rotor 12, as shown in FIG. 3. As shown in FIG. 4, the rotor 12 is a hollow cylindrical shape so as to surround corresponding part of the stabilizer bar 31 and rotatably supported by interior of the housing 1 and a cap member 2 of the housing 1 at bearing 12b disposed at each sides of the rotor 12. The rotor 12 includes multipolar magnets (not shown). The stator 11 is fixed to interior of the housing 1 so as to surround the rotor 12.

The stabilizer bar 31, which is fixed to the ring gear 25 as one side thereof, is rotatably supported at interior of the housing 1 through a bearing 31a. The stabilizer bar 31 is rotatably supported at inferior of the cap member 2 on contact with the bearing 31b at outside of the motor 10. Although the cap member 2 is formed as a different member to the housing 1, the cap member 2 may be integrally formed with the housing 1. The housing 1 expressed in the first embodiment is composed herewith. Namely, in the first embodiment, the one of the pair of stabilizer bars (stabilizer bar 31) connected to the first gear (ring gear 25) passing through the rotor 12 is supported at both the motor 10 side and the first gear (ring gear 25) side in the housing (the housing 1 and the cap member 2). Then, a bending moment to become load can be adequately shared by the stabilizer bar 31, the housing 1 and the cap member 2, and ring gears 25, 26.

In addition, a rotation detection means 40 for detecting rotation of the stabilizer bar 31 is disposed in the housing 1. Although the rotation detection means 40 comprises at least one magnet 41 provided along outer circumferential of the rotor 12 and at least one hall IC 42 disposed at interior of the housing 1 in the present embodiment, another type of the rotation detection means (for example, optical rotary encoder) may be used.

As shown in FIG. 3, according to the first embodiment, the housing side of each end of stabilizer bar 31, 32 is placed in the vicinity of each other, and the distance Df therebetween is shorter than overall length Lf of the housing 1. Accordingly, the stabilizer 31, 32 can have almost the same overall length compared with a non-divided stabilizer (without actuator). The stabilizer bar can be formed same material with same diameter and weight compared with common stabilizer (without actuator). Then, design flexibility can be extended in vehicle width direction.

On the other hand, the composition of the motor M and reduction mechanism RD of the first embodiment may be applied to an actuator described in the background of the present invention. Namely, one end of each stabilizer bar 31, 32 is connected to the housing 1x (for the stabilizer bar 31) and the reduction mechanism RD (for the stabilizer bar 32), respectively. In this configuration, the stabilizer bar 31, 32 can be made to be longer than the configuration using multistage planetary gear mechanism explained in the background of the invention. Although, the length of each stabilizer bar 31, 32 is shorter than the stabilizer bar of the first embodiment since the distance between both connection points (one end) of the stabilizer bars 31, 32 (Lm+Lr) is longer than that of the first embodiment (Df).

Figure 6:
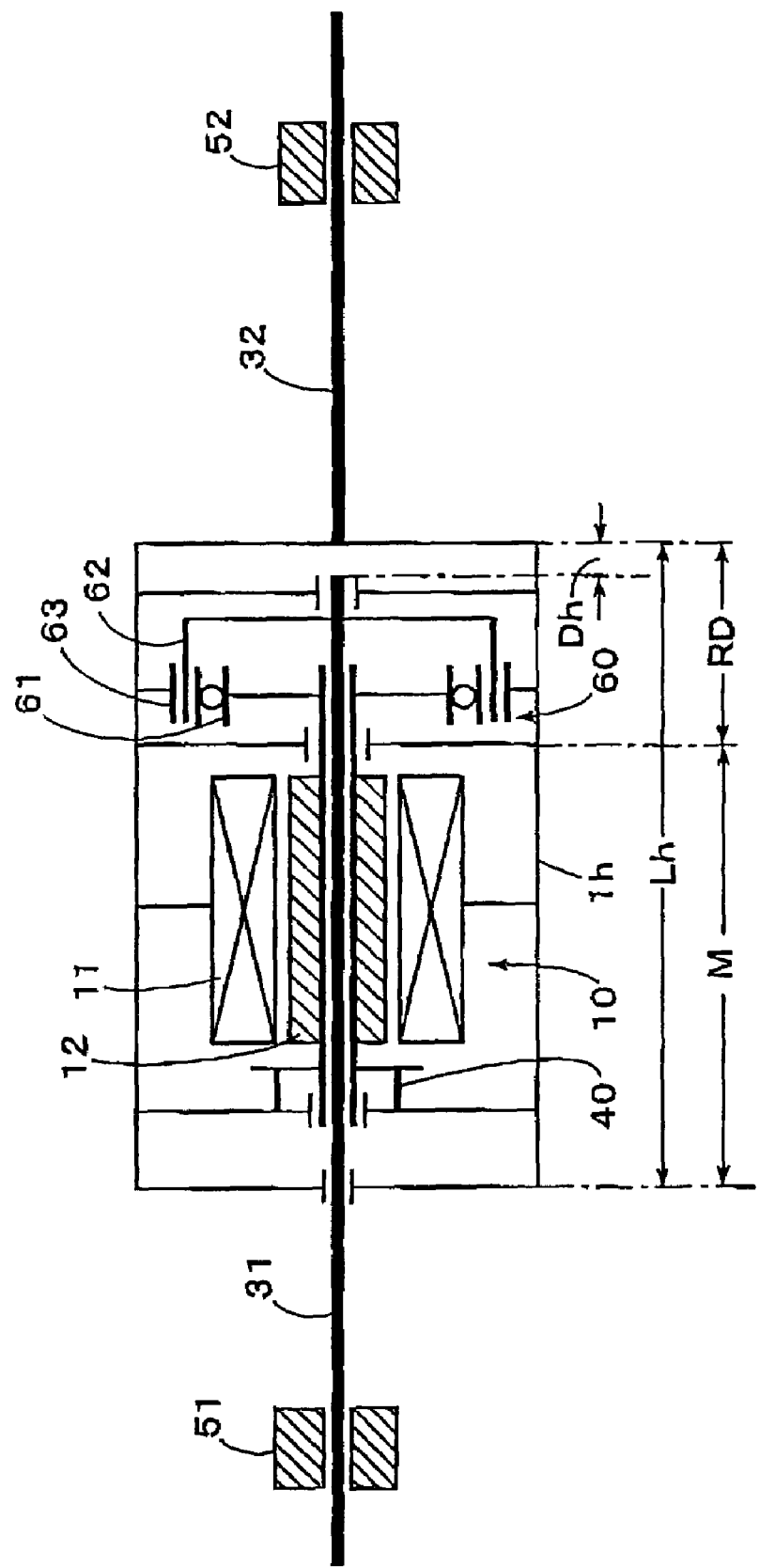
FIG. 6 is a cross sectional skeleton figure of an actuator according to the second embodiment of the present invention.
Figure 7:
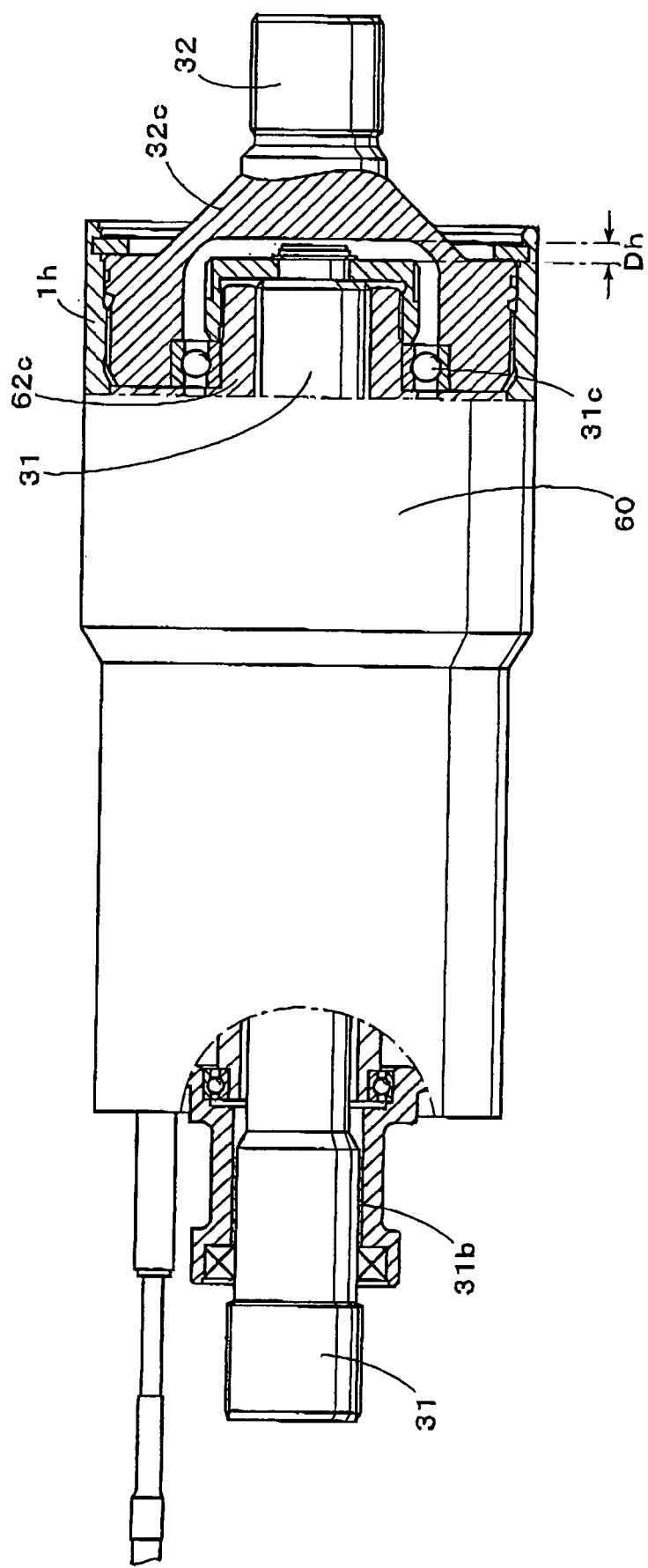
FIG. 7 is a partial cross sectional view of an actuator according to the second embodiment of the present invention.
Figure 8:
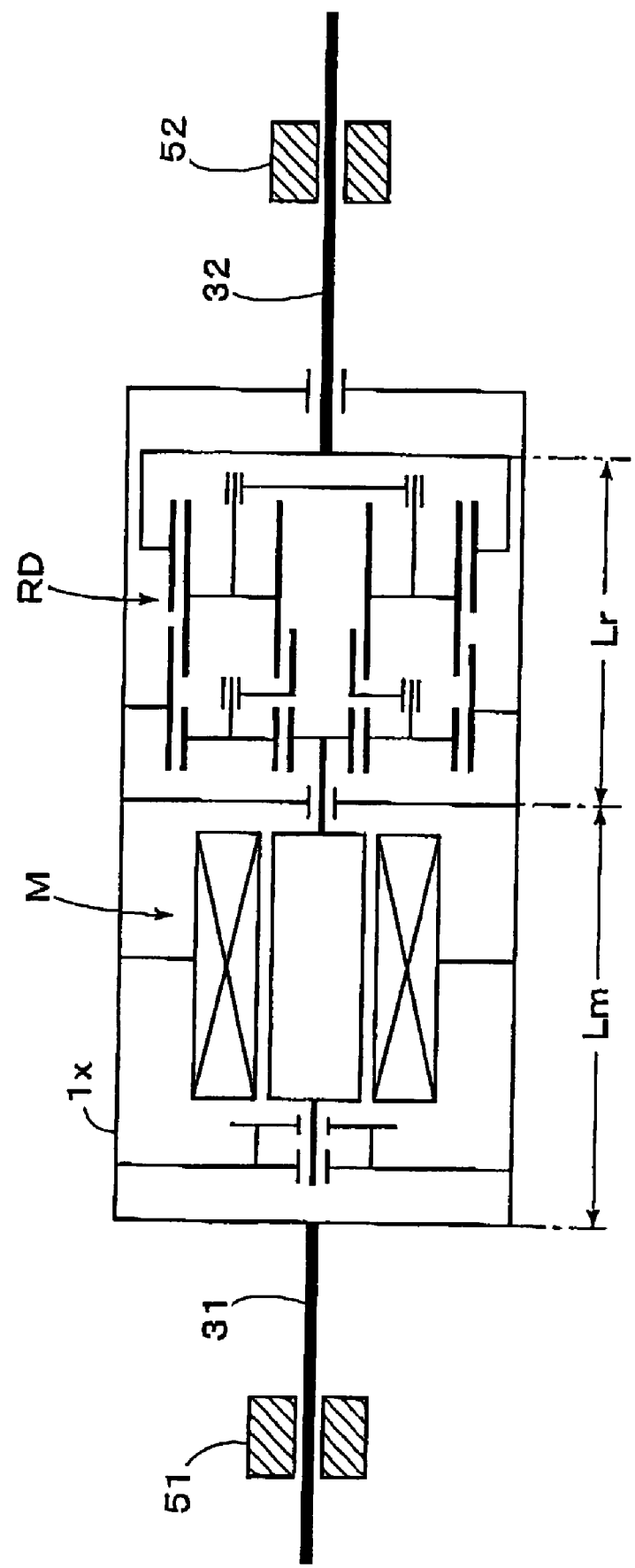
FIG. 8 is a cross sectional skeleton figure of an actuator wherein the actuator construction explained in the background of the invention is alternated to construction of the first embodiment of the present invention.

Next, a second embodiment of the present invention is explained referring to FIG. 6 and FIG. 7. In the second embodiment, a harmonic drive type gear mechanism (hereinafter referred to as gear mechanism) 60 is applied as a reduction mechanism RD. FIG. 6 is a skeleton figure, and FIG. 7 is a concrete cross sectional figure. Corresponding elements are expressed as same number.

For the gear mechanism 60, the stabilizer bar 31, 32 are integrally connected to a flexible gear 62 and a ring gear (second gear) 63, respectively. The flexible gear 62 is expressed as "flexpline" in the opened website described in the background of the invention. Also, the ring gear 63 is expressed as "circular spline". In the second embodiment, stabilizer bar 31, 32 end faces are placed with distance Dh therebetween as shown in FIG. 6 and FIG. 7.

To be more precise, as shown in FIG. 7, the stabilizer bar 31 is supported by an end portion 62c of the flexible gear 62 via a bearing 31c with rotatable condition. Additionally, an end portion 32c integrally formed with the stabilizer bar 32 are fixed to the housing 1h (for example, spline connection is applied to fix). Then, the stabilizer bar 31 is inserted passing through the rotor 12 (abbreviated in FIG. 7), and supported at the end portion 62c of the flexible gear 62 so as to rotate to the housing 1h. On the other hand, the stabilizer bar 32 is integrally jointed to the ring gear 63 since the ring gear 63 is integrally formed with the housing 1h interior side (see FIG. 6). The rotor 12 of the motor 10 is fixed to an elliptic gear 61 and cooperated with the flexible gear 62. The elliptic gear 61 is expressed as "wave generator" in the opened website described in the background of the invention. Then, in the second embodiment, one of the pair of stabilizer bar (stabilizer bar 31) connected to the first gear 62 (end portion 62c) through the rotor 12 (abbreviated in FIG. 7) is supported at both the motor 10 side (abbreviated in FIG. 7) and the first gear 62 (end portion 62c) side in the housing 1h. Then, a bending moment to become load can be adequately shared as well as the first embodiment thereof.

In above mentioned website, function of the elliptic gear 61, the flexible gear 62 and the ring gear 63 is explained below. The elliptic gear 61 corresponding to the "wave generator" is a component having small ball bearings built into the outer circumference of the elliptical cam. The outer raceway is subjected to elastic deformation via the ball bearings. The flexible gear 62 corresponding to the "flexspline" is a thin cup-shaped metal rim component with external teeth. The ring gear 63 corresponding to the "circular spline" is a rigid body ring with internal teeth. The ring gear 63 has two teeth more than the flexible gear 62. For example, when the elliptic gear 61 is rotationally activated with attaching the elliptic gear 61 to the rotor 12 of the motor 10, and attaching the flexible gear 62 to the stabilizer bar 31, rotation of the flexible gear 62 is transmitted to the ring gear 63 engaged with the flexible gear 62. The ring gear 63 rotates opposite rotation direction relative to the rotation of the flexible gear 62, and rotation of the ring gear 63 is reduced since it has two teeth more than the flexible gear 62.

As shown in FIG. 6 and FIG. 7, according to the second embodiment, actuator side of each stabilizer bar 31, 32 is placed close to each other, and the distance Dh therebetween is shorter than overall length Lh of the housing 1h. Accordingly, the stabilizer bars 31, 32 can have almost the same overall length compared with a non-divided stabilizer (without actuator). The stabilizer bars 31, 32 can be formed same material with same diameter and weight compared with common stabilizer (without actuator). In particular, overall length Lh of the housing 1h for the second embodiment can be formed shorter than that (Lf) of the first embodiment. Then, further smaller sized actuator can be made.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A stabilizer control device for a vehicle, comprising:
a pair of stabilizer bars provided between a left wheel and a right wheel of the vehicle; and
an actuator including a reduction mechanism connected between said pair of stabilizer bars and a motor connected to the reduction mechanism for providing torsion force to said pair of stabilizer bars through the reduction mechanism;
wherein the motor and the reduction mechanism are disposed in a housing, the reduction mechanism comprises a first gear and a second gear for generating relative rotational speeds differential therebetween, the first gear and the second gear are coaxially placed adjacent to each other, opposite faces of the stabilizer bars are adjacently connected with the first gear and the second gear respectively and disposed in the reduction mechanism, and one of the pair of stabilizer bars is connected to the first gear passing through a rotor of the motor and is supported by the housing at both sides of the motor and the first gear.

2. A stabilizer control device for vehicle according to claim 1, wherein the first gear and the second gear include a pair of internal tooth gears with different number of teeth, and a common planetary gear train is engaged with both internal tooth gears.

3. A stabilizer control device for vehicle according to claim 2, wherein the planetary gear train includes plural planetary gear sets.

4. A stabilizer control device for vehicle according to claim 2, wherein the planetary gear train is a multistage planetary gear.

5. A stabilizer control device for vehicle according to claim 1, wherein the first gear and the second gear are cooperatively associated with each other.

6. A stabilizer control device for vehicle according to claim 1, wherein the motor is a brush-less motor comprising the rotor and a stator, and the one stabilizer bar is integrally attached to the first gear passing through the rotor.

7. A stabilizer control device for vehicle according to claim 6, wherein the motor and the reduction mechanism are disposed in a housing, and the other stabilizer bar is integrally attached to the housing.

8. A stabilizer control device for vehicle according to claim 7, wherein the other stabilizer bar is integrally attached to the housing.

9. A stabilizer control device for vehicle according to claim 7, wherein the one stabilizer bar is attached to the housing by a spline connection.

10. A stabilizer control device for vehicle according to claim 1, wherein a rotation detection means is provided in the housing for detecting rotation of at least one of the stabilizer bars.

* * * * *